United States Patent [19]
Martinez

[11] Patent Number: 6,125,647
[45] Date of Patent: Oct. 3, 2000

[54] APPARATUS AND METHOD FOR DRAINING ROOF-MOUNTED EVAPORATIVE COOLERS

[76] Inventor: Gene A. Martinez, 7403 S. Cottonwood St., Midvale, Utah 84047

[21] Appl. No.: 09/316,343

[22] Filed: May 21, 1999

[51] Int. Cl.[7] .................................................. F28D 5/00
[52] U.S. Cl. ......................... 62/304; 62/285; 62/DIG. 16
[58] Field of Search ........................ 62/304, 285, 259.1, 62/DIG. 16; 261/29

[56] References Cited

U.S. PATENT DOCUMENTS

| | | |
|---|---|---|
| 2,856,166 | 10/1958 | Goettl . |
| 4,369,148 | 1/1983 | Hawkins ........................ 62/DIG. 16 X |
| 4,562,016 | 12/1985 | Colliver . |
| 4,673,537 | 6/1987 | Goettl ......................................... 261/97 |
| 4,701,286 | 10/1987 | Stillman et al. ........................ 261/36.1 |
| 4,784,184 | 11/1988 | Gates . |
| 5,099,872 | 3/1992 | Tarvin et al. . |
| 5,121,770 | 6/1992 | Thompson ............................ 62/171 X |
| 5,746,950 | 5/1998 | Villanueva . |
| 5,752,540 | 5/1998 | Hansel, Sr. . |
| 5,819,819 | 10/1998 | Stanley . |

*Primary Examiner*—William Doerrler
*Assistant Examiner*—Chen-Wen Jiang
*Attorney, Agent, or Firm*—Clayton, Howarth & Cannon, P.C.

[57] ABSTRACT

A flexible plastic drain sock that is attachable to an exterior of an evaporative cooler and held beneath a discharge port formed in a water pan of the cooler. The drain sock is flexible and is made to have a length sufficient to extend from the cooler to the edge of a roof upon which the cooler is mounted. In this manner, water can be drained from the discharge port into the drain sock and conveyed across the roof and over the edge of the roof without contacting the roof, and thus without depositing corrosive salts and other hard-water debris onto the roof. The drain sock preferably includes a wide entrance that is removably coupled to opposing sides of the cooler.

59 Claims, 2 Drawing Sheets

APPARATUS AND METHOD FOR DRAINING ROOF-MOUNTED EVAPORATIVE COOLERS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. The Field of the Invention

The present invention relates generally to evaporative coolers, and more particularly, but not exclusively, to a portable device for draining water from a roof-mounted evaporative cooler without permitting the water to contact the roof.

2. Description of Related Art

In the evaporative air-conditioning industry, it is customary to operate evaporative coolers with hard water. The hard water evaporates and is circulated into homes and buildings by a blower. As a result, salts and other hard-water deposits accumulate throughout the interior of the cooler, within the filter pads, and in the water pan. Although some of the hard water elements are transported into the air flow along with the evaporated water, a portion of the hard water elements remains in the cooler to clog the filter pads and accumulate in the pan. The water in the pan therefore contains a much higher concentration of salts and other hard-water deposits than normal hard water.

When cleaning and servicing a roof-mounted evaporative cooler, users will remove the salts and other hard-water deposits from the cooler by changing the filter pads and draining the water from the pan directly onto the roof. The discarded water simply runs across the roof and over the edge, and is received in a rain gutter if there is one. Conscientious users might also rinse out the water pan to remove remaining debris and hard-water deposits, letting the rinse water and remaining hard-water deposits drain onto the roof as well.

Applicant has observed that the practice of draining the water from the pan directly onto the roof, with the higher concentration of hard-water salts and debris in the drainage water, has proven to be severely damaging to the roof, particularly to shingled roofs. Even in cases where the evaporative cooler is drained onto the roof only once per year, corrosion to the shingles is quite severe and noticeable. This insight is significant since, to applicant's knowledge, others have failed to identify it or make it known.

More specifically, it continues to be assumed by many, if not all, that roof corrosion is caused solely by a leak in the cooler's water pan, or by overflow from the pan through failure to properly adjust the water level controller. While such occurrences certainly cause and hasten roof corrosion, applicant has discovered that roof corrosion continues to occur even in the absence of leaks or overflow problems. Applicant has therefore provided a significant insight into the cause of roof corrosion by identifying the fact that simply draining the water pan onto the roof once per year can damage the roof.

Accordingly, some of the prior art focus has been misplaced. In an effort to reduce the effects of hard water salts and deposits, attempts have been made in the prior art to reduce the rate of accumulation of hard water debris within the cooler. For example, it is known to divert some of the hard water from the cooler in a "bleed-off" system for reducing accumulation of hard-water debris. U.S. Pat. No. 4,562,016 (granted Dec. 31, 1985 to Colliver) discloses an evaporative air-conditioner water bleed-off system. U.S. Pat. No. 5,746,950 (granted May 5, 1998 to Villanueva) teaches an improvement in an overflow drain line, for controlling the overflow water in an evaporative cooler in a manner that prevents discoloration of and damage to the roof.

Despite the advantages of the evaporative cooler bleed-off systems and overflow tubes, the problem identified by applicant remains unsolved. In the attempted solutions referenced above, the water pan in roof-mounted evaporative coolers is still drained directly onto the roof. This still operates to cause some damage and corrosion to the roof even though the concentration of hard water elements in the drained water has been reduced through bleed off.

The prior art is thus characterized by several disadvantages that are addressed by the present invention. The present invention minimizes, and in some aspects eliminates, the above and other problems by provision of a channeling device that prevents the water from the water pan from contacting the roof while it is being drained from a roof-mounted evaporative cooler. Applicant's insight in identifying the problem as explained above, and providing a simple solution therefor, illustrates the failure of others to identify the problem, as well as surprising results, given the simplicity of the invention and the roof damage it prevents. It is indeed surprising that corrosion of a shingled roof can be prevented by simply channeling the drainage water from an evaporative cooler away from the roof.

BRIEF SUMMARY AND OBJECTS OF THE INVENTION

It is therefore an object of the present invention to provide a drainage apparatus and method for use with evaporative coolers that is simple in design and manufacture.

It is another object of the present invention to provide such a drainage apparatus and method that is capable of draining a water pan of an evaporative cooler without permitting the drainage water to contact a roof upon which the cooler is mounted.

The above objects and others not specifically recited are realized in a specific illustrative embodiment of a flexible plastic drain sock that is attachable to an exterior of an evaporative cooler and held beneath a discharge port formed in a water pan of the cooler. The drain sock is flexible and is made to have a length sufficient to extend from the cooler to the edge of a roof upon which the cooler is mounted. In this manner, water can be drained from the discharge port into the drain sock and conveyed across the roof and over the edge of the roof without contacting the roof, and thus without depositing corrosive salts and other hard-water debris onto the roof. The drain sock preferably includes a wide entrance that is removably coupled to opposing sides of the cooler.

Additional objects and advantages of the invention will be set forth in the description which follows, and in part will be apparent from the description, or may be learned by the practice of the invention without undue experimentation. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawings in which.

DETAILED DESCRIPTION OF THE INVENTION

Figure 1:
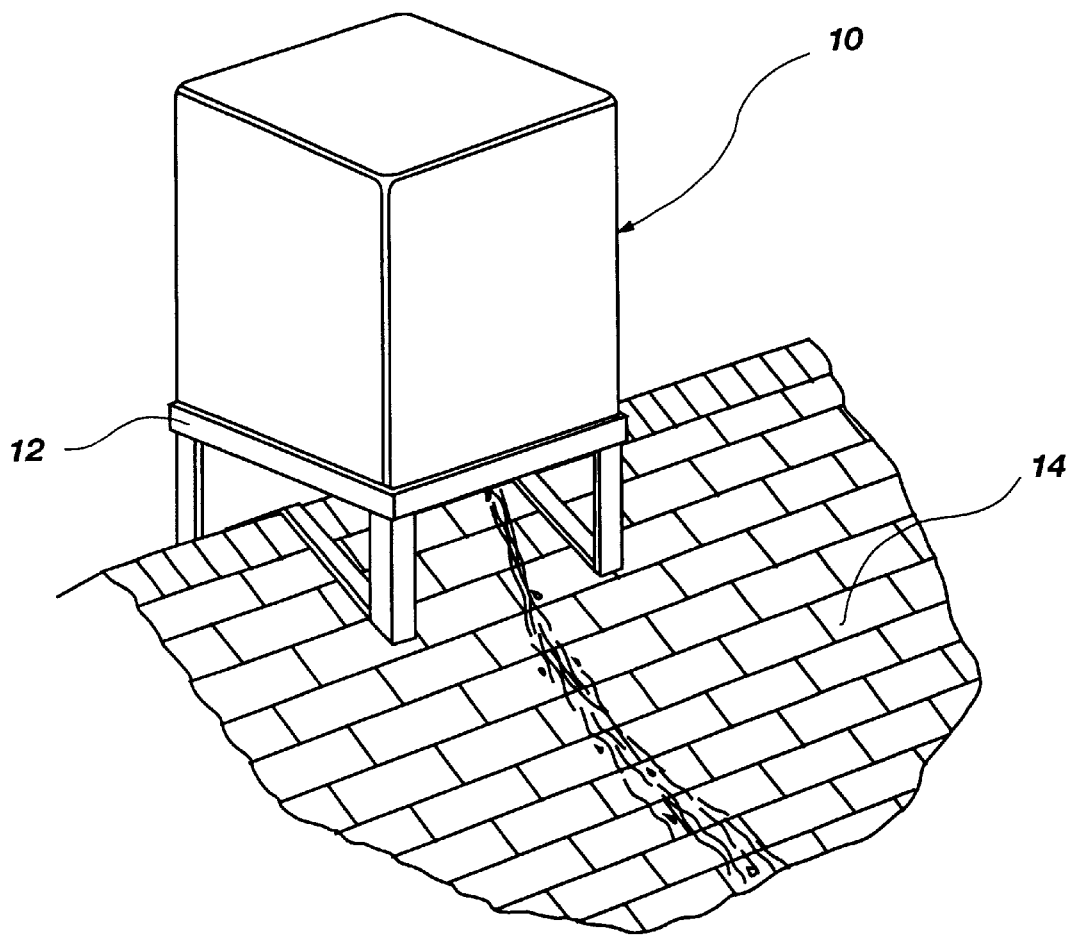
FIG. 1 is a perspective view of a convention draining method utilized to drain a roof-mounted evaporative cooler, as known in the prior art.

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would normally occur to one skilled in the relevant art and having possession of this disclosure, are to be considered within the scope of the invention claimed.

Applicant has discovered that roof corrosion can be caused simply by draining the water pan of an evaporative cooler directly onto the roof, even in the absence of any leaking or overflow problems associated with the water level control. This insight alone is a significant contribution to the problem of roof corrosion, because a problem cannot become solved until it is properly identified. Accordingly, the prior art focus on preventing leaks and overflow and reducing the salt concentration in the water, while useful, is incomplete. Some solutions to the problem are described below in the form of an apparatus and method for draining evaporative coolers without permitting the drainage water to contact the roof upon which the cooler is mounted.

Referring now to FIG. 1, there is shown a prior art method of draining a roof-mounted evaporative cooler, the cooler being designated generally at 10. The user simply removes the drain stop tube (not shown in FIG. 1) and releases the water in the water pan 12 onto the roof 14 where it runs off the edge of the roof and into a rain gutter (not shown in FIG. 1). The salts and other hard-water deposits that have accumulated in the pan 12 flow onto the roof 14 along with the drainage water. Some of the salts and deposits stay on the roof 14 and begin corroding the roof.

Figure 2:
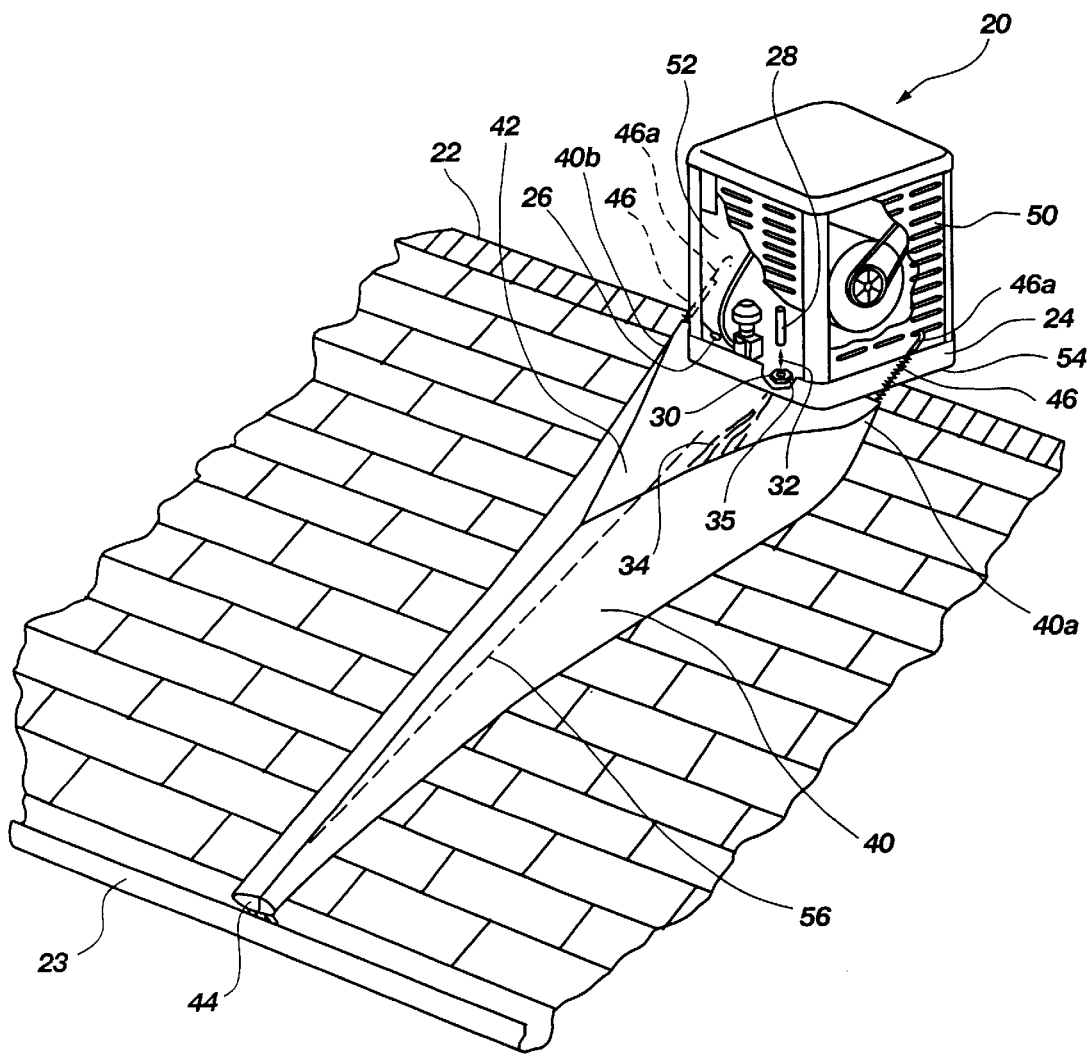
FIG. 2 is a perspective view of a draining apparatus and method of use, in accordance with the principles of the present invention.

Referring now to FIG. 2, there is shown an evaporative cooler, designated generally at 20, as generally known in the field. The cooler 20 is mounted on a roof 22 as is typical, and includes a level of water contained in the base pan 24, the level being limited by the float 26 as well as the overflow tube 28, as known in the art. The overflow tube 28 is open at its top, and is insertable into a fitting 30 disposed in a discharge port 35 formed in the pan 24, such that if the float 26 fails to maintain the water level as desired, water 34 will simply flow into the top of the tube 28 and thereby drain through the discharge port 35 in the bottom of the cooler pan 24.

When users desire to drain the water pan 24 they simply remove the tube 28 as indicated by arrow 32, and permit the water 34 to drain through the port 35 in the fitting 30 which holds the tube 28 in place.

Figure 3:
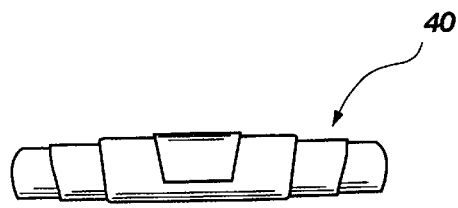
FIG. 3 is a frontal view of the draining apparatus of FIG. 2, in rolled-up, storage position.

The invention involves a drain sock 40, preferably made of flexible plastic so that it can be rolled up and stored in a compact condition, as shown in FIG. 3. The drain sock 40 includes an entrance opening 42 at one end and a discharge opening or exit 44 at an opposing end. Stretch-cords 46 with hooks 46a are used to attach to sides of the cooler 40 as shown, thereby holding the entrance 42 of the drain sock 40 directly beneath the pan opening 35. The hooks 46a are preferably rigid. The exit 44 of the drain sock 40 can then be placed over the edge of the roof 22, preferably within a rain gutter 23, such that when the pan 44 is drained by removing the overflow tube 28, water 34 flows from the port 35 into the drain sock 40 and does not contact the roof 22 because said water 34 is carried by the drain sock 40 from the port 35 directly into the rain gutter 23.

It will be appreciated that the cooler 20 has a first side 50, an opposing second side 52, a water pan 24 that constitutes a bottom extending between said first side 50 and second side 52, a first corner 54 formed by the first side 50 and the bottom of the pan 24 (in which the sides of the pan 24 are also considered to be part of the sides of the cooler 20), and a second corner (not shown in FIG. 2 but evident in view of corner 54) formed by the second side 52 and the bottom of the pan 24.

It is preferable that at least a portion of the drain sock 40 have a cross-sectional area of at least 0.35 ft$^2$.

The drain sock 40 may be properly referred to as a water channeling member. The stretch cords 46 and hooks 46a are one embodiment of an attachment means for (i) attaching a first portion 40a of the drain sock 40 or water channeling member to the first side 50 of the evaporative cooler 20, (ii) attaching a second portion 40b of the water channeling member 40 to the opposing second side 52 of the evaporative cooler 20, and (iii) holding the entrance 42 of the water channeling member 40 beneath the evaporative cooler 20 in an orientation such that said attachment means (or cords 46 and hooks 46a) and said water channeling member 40 cooperatively extend from the first side 50 of the evaporative cooler 20 downwardly across a lower portion of said first side 50, around the first corner 54 and across the entire bottom of the evaporative cooler 20 from said first corner 54 to the second corner (not shown in FIG. 2), around said second corner and upwardly to a location on the second side 52 of said evaporative cooler 20.

The stretch cords 46 may be described as flexible members that are stretchable and have elastic memory. The first portion 40a of the drain sock 40 is preferably part of a first side of the drain sock 40, and the second portion 40b is likewise preferably part of a second side of the drain sock.

The entrance 42 of the drain sock 40 is preferably comparably wide in comparison to the bottom of the evaporative cooler 20, and several times wider than the discharge port or opening 35 formed in the bottom of the cooler 20. The drain sock, when in an uncollapsed configuration, defines an elongate axis 56. The phrase "comparably wide" as used herein shall refer broadly to the concept of one item being either roughly equal in the area of comparison or no greater or less than twenty-five percent of the comparison.

The stretch cords 46 and hooks 46a may further be described as a means for spreading the entrance 42 of the drain sock 40 in a lateral direction such that said entrance 42 faces the bottom of the evaporative cooler 20 and spans at least ninety percent of said bottom of said evaporative cooler 20. As shown in FIG. 2, the entrance 42 preferably spans the entire bottom of the cooler 20. This increases collection and channeling capacity of the drain sock 40, and also permits simultaneous use of discharge ports in addition to the port 35, if there are any such additional ports.

The drain sock 40 is preferably at least three feet long and terminates in the exit 44 (also referred to as an exit opening) such that the act of holding the entrance 42 beneath the cooler 20 by the stretch chords 46 results in the drain sock 40 extending from beneath the cooler 20 outwardly along its elongate axis 56 to a remote location with respect to said cooler 20 (the remote location being at the rain gutter 23 in the situation illustrated in FIG. 2) such that said exit 44 resides at least three feet from said cooler 20.

The stretch cords 46 and hooks 46a may further be described as a means for holding the drain sock 40 in an orientation such that (i) the drain sock 40 or water channeling member extends from beneath the evaporative cooler 20 outwardly along its elongate axis 56 to a remote location with respect to said evaporative cooler 20, and (ii) the drain sock 40 or water channeling member resides in a detached orientation with respect to said bottom of said evaporative cooler 20. In other words, the drain sock 40 need not be affixed directly to the cooler 20 or pan 24, but may hang loosely below the cooler 20 as shown in FIG. 2.

The drain sock 40 may be constructed to include an external surface that tapers radially inwardly along the axis 56 in an entrance-to-exit direction, as shown in FIG. 2. The drain sock 40 may also be constructed to become progressively smaller in cross-section along its axis 56 in the entrance-to-exit direction, as shown in FIG. 2.

It is most preferable that the entire drain sock 40 be flexible. The term "flexible" as used herein shall refer broadly to the concept of a material that cannot retain a particular volumetric shape without some external holding force, or, a material that lacks sufficient elastic memory to assume a particular volumetric shape without external aid. For example, a bed sheet, a shirt, or a plastic bag are examples of flexible items, because they cannot maintain a particular volumetric shape on their own. Hence, the term "rigid" as used herein shall be construed broadly to refer to the concept of a material that can maintain a particular volumetric shape without external force.

The drain sock 40 is preferably characterized by an absence of a rigid water holding member. More preferably, the drain sock 40 is characterized by an absence of a rigid, planer water holding member. The drain sock 40 preferably defines a frustoconical shape when disposed in an uncollapsed configuration, as shown in FIG. 2.

As shown in FIG. 3, the drain sock 40 is preferably constructed from a flexible material having sufficient flexibility to enable said channeling member to be collapsed and rolled into a roll for storage.

It will be appreciated that the fitting 30 should preferably be removed when draining the cooler 20, because it tends to block removal of some of the hard-water deposits and other debris.

In accordance with the features and combinations described above, a preferred method of draining water from a water pan of an evaporative cooler, wherein said water pan has a bottom and a discharge opening formed in said bottom and a fitting disposed in said discharge opening, comprises the steps of:

(a) attaching an entrance of a water channeling member beneath the discharge opening of the water pan;

(b) positioning an exit of the water channeling member at a remote location at least three feet from the cooler; and (c) removing the fitting from the discharge opening of the water pan and releasing water from the water pan through the discharge opening and into the water channeling member.

The above method may be augmented, wherein step (a) further comprises the step of selecting a water channeling member having an entrance that is at least as wide as ninety percent of a width of the bottom of the water pan. The method may be still further augmented, wherein step (a) still further comprises attaching the entrance of the water channeling member to the evaporative cooler such that said entrance spans at least ninety percent of the bottom of the water pan.

The above method may also be augmented in which step (b) further comprising placing the exit of the water channeling member at an edge of a roof upon which the evaporative cooler is mounted.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A draining apparatus for use in draining an evaporative cooler, said cooler having a first side, an opposing second side, a bottom extending between said first side and second side, a first corner formed by the first side and the bottom, and a second corner formed by the second side and the bottom, said draining apparatus comprising:

an elongate water channeling member having an entrance at a first end thereof, at least a portion of said water channeling member having a cross-sectional area of at least 0.35 ft$^2$; and attachment means for (i) attaching a first portion of the water channeling member to the first side of the evaporative cooler, (ii) attaching a second portion of the water channeling member to the opposing second side of the evaporative cooler, and (iii) holding the entrance of the water channeling member beneath the evaporative cooler in an orientation such that said attachment means and said water channeling member cooperatively extend from the first side of the evaporative cooler downwardly across a lower portion of said first side, around the first corner and across the entire bottom of the evaporative cooler from said first corner to the second corner, around said second corner and upwardly to a location on the second side of said evaporative cooler.

2. The draining apparatus of claim 1, wherein the water channeling member is made of a flexible, plastic material.

3. The draining apparatus of claim 1, wherein the attachment means comprises a pair of elongate, flexible members, each flexible member having a rigid, hook-shaped member attached thereto.

4. The draining apparatus of claim 3, wherein the flexible members are stretchable and have elastic memory.

5. The draining apparatus of claim 3, wherein the entrance of the water channeling member includes a first side and an opposing second side, and wherein one of the flexible members is attached to each of the first and second sides of said entrance of said water channeling member.

6. The draining apparatus of claim 1 in which the bottom of the cooler includes a discharge opening formed therein:

wherein the entrance of the water channeling member is comparably wide in comparison to the bottom of the evaporative cooler and several times wider than the discharge opening formed in the bottom of the cooler, said water channeling member defining an elongate axis;

wherein the attachment means further comprises means for spreading the entrance of the water channeling member in a lateral direction such that said entrance faces the bottom of the evaporative cooler and spans at least ninety percent of said bottom of said evaporative cooler.

7. The draining apparatus of claim 6, wherein the elongate water channeling member is at least three feet long and terminates in an exit such that holding the entrance of the water channeling member beneath the cooler by the attachment means results in said channeling member extending from beneath said cooler outwardly along its elongate axis to a remote location with respect to said cooler such that said exit resides at least three feet from said cooler.

8. The draining apparatus of claim 6, wherein the entrance of the water channeling member spans the entire bottom of the evaporative cooler.

9. The draining apparatus of claim 1, wherein the water channeling member defines an elongate axis, and wherein the attachment means further comprises means for holding said water channeling member in an orientation such that (i) the water channeling member extends from beneath the evaporative cooler outwardly along its elongate axis to a remote location with respect to said evaporative cooler, and (ii) the water channeling member resides in a detached orientation with respect to said bottom of said evaporative cooler.

10. The draining apparatus of claim 1 in which the bottom of the cooler includes a discharge opening formed therein:

wherein the water channeling member is tubular and further includes an exit at an opposing, second end thereof, wherein said water channeling member defines an elongate axis and has an external surface that tapers radially inwardly along said axis in an entrance-to-exit direction.

11. The draining apparatus of claim 10, wherein the water channeling member becomes progressively smaller in cross-section along its axis in the entrance-to-exit direction.

12. The draining apparatus of claim 10, wherein the water channeling member is characterized by an absence of a rigid water holding member.

13. The draining apparatus of claim 10, wherein the water channeling member is characterized by an absence of a rigid, planer water holding member.

14. The draining apparatus of claim 10, wherein the water channeling member is constructed from a flexible material and defines a frustoconical shape when disposed in an uncollapsed configuration.

15. The draining apparatus of claim 1, wherein the water channeling member is constructed from a flexible material having sufficient flexibility to enable said channeling member to be collapsed and rolled into a roll for storage.

16. A draining apparatus for use in draining an evaporative cooler, said cooler having a bottom and a discharge opening formed in said bottom, said draining apparatus comprising:

an elongate water channeling member having an entrance at a first end thereof, said entrance being comparably wide in comparison to the bottom of the evaporative cooler and several times wider than the discharge opening formed in the bottom of the cooler, said water channeling member defining an elongate axis; and attachment means for attaching the water channeling member to the evaporative cooler and holding the entrance of said water channeling member beneath the evaporative cooler and spreading the entrance of waid water channeling member in a lateral direction such that said entrance faces the bottom of the evaporative cooler and spans at least ninety percent of said bottom of said evaporative cooler.

17. The draining apparatus of claim 16, wherein the elongate water channeling member is at least three feet long and terminates in an exit such that holding the entrance of the water channeling member beneath the cooler by the attachment means results in said channeling member extending from beneath said cooler outwardly along its elongate axis to a remote location with respect to said cooler such that said exit resides at least three feet from said cooler.

18. The draining apparatus of claim 16, wherein the entrance of the water channeling member spans the entire bottom of the evaporative cooler.

19. The draining apparatus of claim 16, wherein the attachment means further comprises means for (i) attaching a first portion of the water channeling member to the first side of the evaporative cooler, (ii) attaching a second portion of the water channeling member to the opposing second side of the evaporative cooler, and (iii) holding the entrance of the water channeling member beneath the evaporative cooler in an orientation such that said attachment means and said water channeling member cooperatively extend from the first side of the evaporative cooler downwardly across a lower portion of said first side, around the first corner and across the entire bottom of the evaporative cooler from said first corner to the second corner, around said second corner and upwardly to a location on the second side of said evaporative cooler.

20. The draining apparatus of claim 16, wherein the water channeling member is made of a flexible, plastic material.

21. The draining apparatus of claim 16, wherein the attachment means comprises a pair of elongate, flexible members, each flexible member having a rigid, hook-shaped member attached thereto.

22. The draining apparatus of claim 21, wherein the flexible members are stretchable and have elastic memory.

23. The draining apparatus of claim 21, wherein the entrance of the water channeling member includes a first side and an opposing second side, and wherein one of the flexible members is attached to each of the first and second sides of said entrance of said water channeling member.

24. The draining apparatus of claim 16, wherein the water channeling member defines an elongate axis, and wherein the attachment means further comprises means for holding said water channeling member in an orientation such that (i) the water channeling member extends from beneath the evaporative cooler outwardly along its elongate axis to a remote location with respect to said evaporative cooler, and (ii) the water channeling member resides in a detached orientation with respect to said bottom of said evaporative cooler.

25. The draining apparatus of claim 16 in which the bottom of the cooler includes a discharge opening formed therein:

wherein the water channeling member is tubular and further includes an exit at an opposing, second end thereof, wherein said water channeling member defines an elongate axis and has an external surface that tapers radially inwardly along said axis in an entrance-to-exit direction.

26. The draining apparatus of claim 25, wherein the water channeling member becomes progressively smaller in cross-section along its axis in the entrance-to-exit direction.

27. The draining apparatus of claim 25, wherein the water channeling member is characterized by an absence of a rigid water holding member.

28. The draining apparatus of claim 25, wherein the water channeling member is characterized by an absence of a rigid, planer water holding member.

29. The draining apparatus of claim 25, wherein the water channeling member is constructed from a flexible material and defines a frustoconical shape when disposed in an uncollapsed configuration.

30. The draining apparatus of claim 16, wherein the water channeling member is constructed from a flexible material having sufficient flexibility to enable said channeling member to be collapsed and rolled into a roll for storage.

31. A draining apparatus for use in draining an evaporative cooler, said cooler having a bottom and a discharge opening formed in said bottom, said draining apparatus comprising:

an elongate water channeling member having an entrance at a first end thereof, said water channeling member defining an elongate axis; and attachment means for attaching the water channeling member to the evaporative cooler and holding said water channeling member in an orientation such that (i) the water channeling member extends from beneath the evaporative cooler outwardly along its elongate axis to a remote location with respect to said evaporative cooler, (ii) the entrance of said water channeling member resides beneath the discharge opening formed in the bottom of the evaporative cooler, and (iii) the water channeling member resides in a detached orientation with respect to said bottom of said evaporative cooler.

32. The draining apparatus of claim 31, wherein the attachment means further comprises means for spreading the entrance of the water channeling member in a lateral direction such that said entrance faces the bottom of the evaporative cooler and spans at least ninety percent of said bottom of said evaporative cooler.

33. The draining apparatus of claim 31, wherein the water channeling member is made of a flexible, plastic material.

34. The draining apparatus of claim 31, wherein the attachment means comprises a pair of elongate, flexible members, each flexible member having a rigid, hook-shaped member attached thereto.

35. The draining apparatus of claim 34, wherein the flexible members are stretchable and have elastic memory.

36. The draining apparatus of claim 34, wherein the entrance of the water channeling member includes a first side and an opposing second side, and wherein one of the flexible members is attached to each of the first and second sides of said entrance of said water channeling member.

37. A draining apparatus for use in draining an evaporative cooler, said cooler having a bottom and a discharge opening formed in said bottom, said draining apparatus comprising:

an elongate, tubular water channeling member having an entrance at a first end thereof and an exit at an opposing, second end thereof, wherein said water channeling member defines an elongate axis and has an external surface that tapers radially inwardly along said axis in an entrance-to-exit direction; and attachment means for attaching the water channeling member to the evaporative cooler and holding the entrance of said water channeling member below the discharge opening formed in the cooler.

38. The draining apparatus of claim 37, wherein the external surface of the water channeling member tapers radially inwardly along a majority length of the axis in the entrance-to-exit direction.

39. The draining apparatus of claim 37, wherein the water channeling member is characterized by an absence of a rigid water holding member.

40. The draining apparatus of claim 37, wherein the water channeling member is characterized by an absence of a rigid, planer water holding member.

41. The draining apparatus of claim 37, wherein the water channeling member becomes progressively smaller in cross-section along its axis in the entrance-to-exit direction.

42. The draining apparatus of claim 37, wherein the water channeling member is frustoconical in shape.

43. The draining apparatus of claim 37, wherein the water channeling member is constructed from a flexible material and defines a frustoconical shape when disposed in an uncollapsed configuration.

44. The draining apparatus of claim 37, wherein the water channeling member is made of a flexible, plastic material.

45. The draining apparatus of claim 37, wherein the attachment means comprises a pair of elongate, flexible members, each flexible member having a rigid, hook-shaped member attached thereto.

46. The draining apparatus of claim 45, wherein the flexible members are stretchable and have elastic memory.

47. The draining apparatus of claim 45, wherein the entrance of the water channeling member includes a first side and an opposing second side, and wherein one of the flexible members is attached to each of the first and second sides of said entrance of said water channeling member.

48. A draining apparatus for use in draining an evaporative cooler, said cooler having a bottom and a discharge opening formed in said bottom, said draining apparatus comprising:

an elongate water channeling member having an entrance at a first end thereof and an exit at an opposing, second end thereof; and attachment means for attaching the water channeling member to the evaporative cooler and holding the entrance of said water channeling member below the discharge opening formed in the cooler;

wherein the water channeling member is constructed from a flexible material having sufficient flexibility to enable said channeling member to be collapsed and rolled into a roll for storage.

49. The draining apparatus of claim 48, wherein the water channeling member is made of a flexible, plastic material.

50. The draining apparatus of claim 48, wherein the attachment means comprises a pair of elongate, flexible members, each flexible member having a rigid, hook-shaped member attached thereto.

51. The draining apparatus of claim 50, wherein the flexible members are stretchable and have elastic memory.

52. The draining apparatus of claim 50, wherein the entrance of the water channeling member includes a first side and an opposing second side, and wherein one of the flexible members is attached to each of the first and second sides of said entrance of said water channeling member.

53. A draining apparatus for use in draining an evaporative cooler, said cooler having a first side, an opposing second side, a bottom extending between said first side and second side, a first corner formed between the first side and the bottom, and a second corner formed between the second side and the bottom, said draining apparatus comprising:

an elongate water channeling member having an entrance at a first end thereof; and attachment means for (i) attaching a first portion of the water channeling member to the first side of the evaporative cooler, (ii) attaching a second portion of the water channeling member to the opposing second side of the evaporative cooler, and (iii) holding the entrance of the water channeling member beneath the evaporative cooler, such that said attachment means and said water channeling member cooperatively extend from the first side of the evaporative cooler downwardly across a lower portion of said first side, around the first corner and across the entire bottom of the evaporative cooler from said first corner to the second corner, around said second corner and upwardly to a location on the second side of said evaporative cooler.

54. A draining apparatus for use in draining an evaporative cooler, said cooler having a first side, an opposing second side, a bottom extending between said first side and second side, a first corner formed by the first side and the bottom, a second corner formed by the second side and the bottom, and a discharge opening formed in the bottom, said draining apparatus comprising:

an elongate water channeling member having an entrance at a first end thereof, at least a portion of said water channeling member having a cross-sectional area of at least 0.35 ft$^2$; and attachment means for (i) attaching a first portion of the water channeling member to the first side of the evaporative cooler, (ii) attaching a second portion of the water channeling member to the opposing second side of the evaporative cooler, and (iii) holding the entrance of the water channeling member beneath the evaporative cooler in an orientation such that said attachment means and said water channeling member cooperatively extend from the first side of the evaporative cooler downwardly across a lower portion of said first side, around the first corner and across the entire bottom of the evaporative cooler from said first corner to the second corner, around said second corner and upwardly to a location on the second side of said evaporative cooler;

wherein the water channeling member is made of a flexible, plastic material;

wherein the attachment means further comprises a pair of elongate, flexible members, each flexible member having a rigid, hook-shaped member attached thereto, wherein the flexible members are stretchable and have elastic memory;

wherein the entrance of the water channeling member includes a first side and an opposing second side, and wherein one of the flexible members is attached to each of the first and second sides of said entrance of said water channeling member;

wherein the entrance of the water channeling member is comparably wide in comparison to the bottom of the evaporative cooler and several times wider than the discharge opening formed in the bottom of the cooler, said water channeling member defining an elongate axis;

wherein the attachment means further comprises means for spreading the entrance of the water channeling member in a lateral direction such that said entrance faces the bottom of the evaporative cooler and spans at least ninety percent of said bottom of said evaporative cooler;

wherein the elongate water channeling member is at least three feet long and terminates in an exit such that holding the entrance of the water channeling member beneath the cooler by the attachment means results in said channeling member extending from beneath said cooler outwardly along its elongate axis to a remote location with respect to said cooler such that said exit resides at least three feet from said cooler;

wherein the water channeling member defines an elongate axis, and wherein the attachment means further comprises means for holding said water channeling member in an orientation such that (i) the water channeling member extends from beneath the evaporative cooler outwardly along its elongate axis to a remote location with respect to said evaporative cooler, and (ii) the water channeling member resides in a detached orientation with respect to said bottom of said evaporative cooler;

wherein the water channeling member is tubular and further includes an exit at an opposing, second end thereof, wherein said water channeling member defines an elongate axis and has an external surface that tapers radially inwardly along said axis in an entrance-to-exit direction;

wherein the water channeling member becomes progressively smaller in cross-section along its axis in the entrance-to-exit direction;

wherein the water channeling member is characterized by an absence of a rigid, planer water holding member;

wherein the water channeling member is constructed from a flexible material and defines a frustoconical shape when disposed in an uncollapsed configuration;

wherein the water channeling member is constructed from a flexible material having sufficient flexibility to enable said channeling member to be collapsed and rolled into a roll for storage.

55. A method of draining water from a water pan of an evaporative cooler, said water pan having a bottom and a discharge opening formed in said bottom and a fitting disposed in said discharge opening, said method comprising the steps of:

(a) attaching an entrance of a water channeling member beneath the discharge opening of the water pan;

(b) positioning an exit of the water channeling member at a remote location at least three feet from the cooler; and (c) removing the fitting from the discharge opening of the water pan and releasing water from the water pan through the discharge opening and into the water channeling member.

56. The method of claim 55, wherein step (a) further comprises the step of selecting a water channeling member having an entrance that is at least as wide as ninety percent of a width of the bottom of the water pan.

57. The method of claim 56, wherein step (a) still further comprises attaching the entrance of the water channeling member to the evaporative cooler such that said entrance spans at least ninety percent of the bottom of the water pan.

58. The method of claim 55, wherein step (b) further comprising placing the exit of the water channeling member at an edge of a roof upon which the evaporative cooler is mounted.

59. The method of claim 55, wherein step (c) further comprises removing an overflow tube from the fitting.

* * * * *